(12) United States Patent
Zhu et al.

(10) Patent No.: US 11,194,465 B2
(45) Date of Patent: Dec. 7, 2021

(54) ROBOT EYE LAMP CONTROL METHOD AND APPARATUS AND TERMINAL DEVICE USING THE SAME

(71) Applicant: UBTECH ROBOTICS CORP LTD, Shenzhen (CN)

(72) Inventors: Liming Zhu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 160 days.

(21) Appl. No.: 16/699,744

(22) Filed: Dec. 2, 2019

(65) Prior Publication Data

US 2020/0210038 A1 Jul. 2, 2020

(30) Foreign Application Priority Data

Dec. 28, 2018 (CN) .......................... 201811624888.0

(51) Int. Cl.
*G06F 3/0488* (2013.01)
*G06T 1/60* (2006.01)
*H05B 45/20* (2020.01)
*G06F 3/0484* (2013.01)

(52) U.S. Cl.
CPC ........ *G06F 3/0488* (2013.01); *G06F 3/04847* (2013.01); *G06T 1/60* (2013.01); *H05B 45/20* (2020.01); *G06T 2200/24* (2013.01)

(58) Field of Classification Search
CPC ....... G06T 1/60; G06T 2200/24; H05B 45/20; G06F 3/04847; G06F 3/147; A63H 3/42; A63H 3/006; A63H 2200/00; A63H 3/38
See application file for complete search history.

(56) References Cited

U.S. PATENT DOCUMENTS

2017/0206064 A1* 7/2017 Breazeal ................... G06F 8/36
2019/0274206 A1* 9/2019 Altamura ............... H05B 47/19

* cited by examiner

*Primary Examiner* — William A Beutel (57) ABSTRACT

The present disclosure provides a robot eye lamp control method as well as an apparatus and a terminal device using the same. The method includes: loading a simulation image corresponding to an cut shape of the eye lamp of the robot onto a display interface of a terminal device remotely connected with the robot; detecting a color setting instruction issued to each color block area in the simulation image by a user, and generating combined parameter information comprising each color value in response to having received a color confirmation instruction issued by the user, and transmitting the combined parameter information to the robot so that the robot performs a light control on the eye lamp based on the combined parameter information. The present disclosure guarantees that the robot will respond to an interactive instruction only when the light display effect and the actual demand of the user matches.

20 Claims, 9 Drawing Sheets

ROBOT EYE LAMP CONTROL METHOD AND APPARATUS AND TERMINAL DEVICE USING THE SAME

CROSS REFERENCE TO RELATED APPLICATIONS

This application claims priority to Chinese Patent Application No. 201811624888.0, filed Dec. 28, 2018, which is hereby incorporated by reference herein as if set forth in its entirety.

BACKGROUND

1. Technical field

The present disclosure relates to robot technology, and particularly to a robot eye lamp control method as well as an apparatus and a terminal device using the same.

2. Description of Related Art

With the rapid advancement of computer, microelectronics and information technologies, the development of robotics technology is getting faster and faster, the intelligence is getting higher and higher, and the application range is also greatly expanded. Because robot toys provide great novelty and interest, which can improve children's attention, observation and cognitive ability, contribute to the developments of children's imagination and thinking, the robot toys are gradually applied to children's early education environment.

The programmable robot toys currently available tin the market typically have a set of light emitting diode (LED) eye lamps. The state of human eyes can be simulated by controlling the LED eye lamps to flash in different colors, thereby improving the human-computer interaction experience for the user. However, in the existing control manners of the eye lamp of the robot, the user can only determine and transmit a JSON (JavaScript object notation) interactive instruction related to each LED eye lamp according to an agreed instruct on structure. If the real tight display effect of the eye lamp of the robot does not match the actual need of the user after the color change is completed, it can only rewrite and transmit the interactive instruction. In this process, since the robot will responds to interactive instructions frequently, the problem of system resource wastes will be caused, and the control efficiency of the user to the eye lamp of the robot will also be reduced.

BRIEF DESCRIPTION OF THE DRAWINGS

To describe live technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
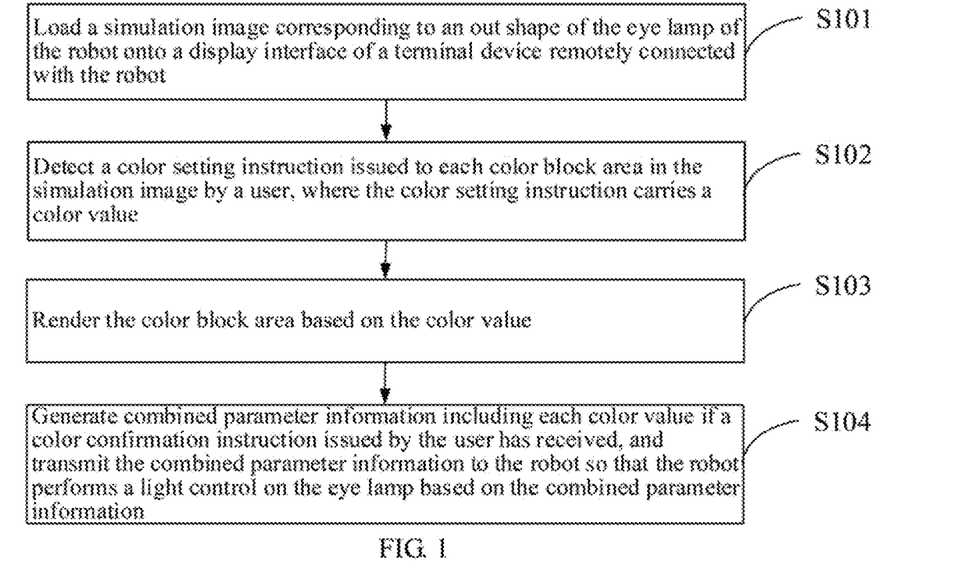
FIG. 1 is a flow chart of an embodiment of a robot eye lamp control method according to the present disclosure.
Figure 7:
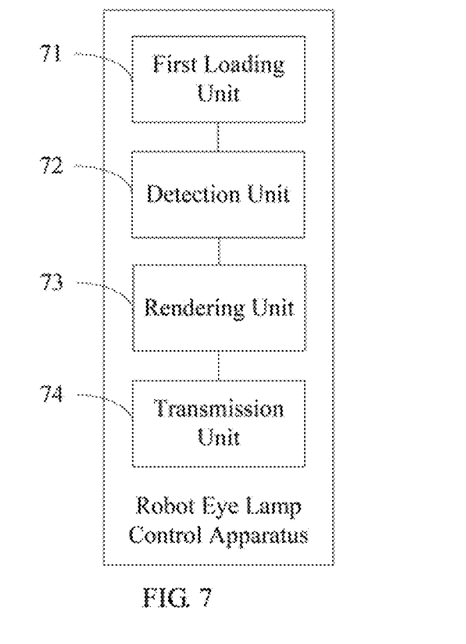
FIG. 7 is a schematic block diagram of an embodiment of a robot eye lamp control apparatus according to the present disclosure.
Figure 8:
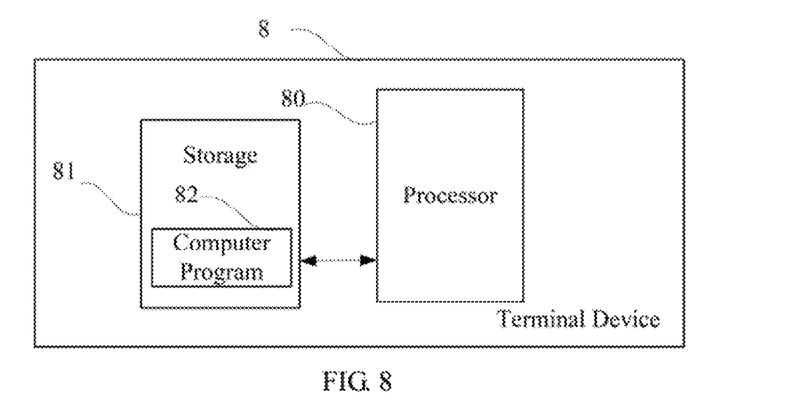
FIG. 8 is a schematic block diagram of an embodiment of a terminal device according to the present disclosure.

FIG. 1 is a flow chart of an embodiment of a robot eye lamp control method according to the present disclosure. In this embodiment, a control method for an eye lamp (which is composed of single or plural of lamps such as LED lamps) of a robot (e.g., a humanoid robot) is provided. The method is a computer-implemented method executable for a processor, which may be implemented through and applied to a robot eye lamp control apparatus as shown in FIG. 7, a terminal device as shown in FIG. 8 including a wireless communication module, where the terminal device can include but not limited to a mobile terminal device such as a mobile phone, a tablet, and a laptop computer, or implemented through a computer readable storage medium. As shown in FIG. 1, the method includes steps S101-S104, which includes the following steps.

S101: loading a simulation mage corresponding to an out shape of the eye lamp of the robot onto a display interface of a terminal device remotely connected with the robot.

In this embodiment, the wireless communication module includes, but is not limited to, a communication module based on Bluetooth technology. Wireless Fidelity (Wi-Fi) technology, or Near-Field Communication (NFC) technology. The terminal device realizes a remote pairing and connection with the robot through the wireless communication module. The simulation image that matches a device model of the robot is loaded according to the device model uploaded by the robot. In which, the simulation image is for simulating the appearance display effect of the eye lamp of the robot, which includes the pattern and color presented by the eye lamp of the robot.

In which, the above-mentioned simulation image can be a two-dimensional planar image corresponding to the eye lamp of the robot, or be a three-dimensional stereo image.

S102: detecting a color setting instruction issued to each color block area in the simulation image by a user, where the color setting instruction carries a color value.

Since the eye lamp of the robot is usually composed of multiple sets of LED eye lamps, and different LED eye lamps can present different light colors, the overall appearance of the eye lamp of the robot will present a plurality of color block areas.

In this embodiment, in order to obtain a better simulation effect of the out shape of the eye lamp of the robot, the loaded simulation image also includes a plurality of color block areas, and each color block area is an operable object in the display interface (e.g., a graphical interface of an application program) of the terminal device. When the user (e.g., a developer or a consumer of the robot product) is to select a color for any of the color block areas, a pre-installed color wheel component will be executed. The above-mentioned color wheel component is for displaying graphic controls (widgets) corresponding to various color values, so that the user can click and select a graphic control that meets his own needs according to the color value of the graphic control. The color setting instruction carrying the color value is generated based on the color value of the selected image control. In which, the operation object of the color setting instruction is one color block area selected by the user.

S103: rendering the color block area based on the color value.

In this embodiment, the color setting instruction is parsed to extract the color value carried by the color setting instruction. For the color block area which has the corresponding color setting instruction being detected, a style parameter associated with the color block area is read. By updating a color attribute in the style parameter as the color value carried by the color setting instruction, the color block area can be rendered by using the color value.

S104: generating combined parameter information including each color value if a color confirmation instruction issued by the user has received, and transmitting the combined parameter information to the robot so that the robot performs a light control on the eye lamp based on the combined parameter information.

In the display interface of the terminal device, the color area(s) after rendered based the color value are displayed. When the color value of one or more color areas are changed, an updated simulation image can be obtained.

In this embodiment, by viewing the simulation image in the display interface of the terminal device, the user can determine whether the color combination effect exhibited by the simulation image meets the lighting demand effect of the eye lamp of the robot. If it is determined that the color combination effect exhibited by the simulation image meets the lighting demand effect of the eye lamp of the robot, a color confirmation instruction is issued; otherwise, it returns to the above-mentioned step S102 to re-detect the color setting instruction issued to each color block area by the user and re-render to obtain a new simulation image.

When receiving the color confirmation instruction issued by the user, the combined parameter information including each color value is generated based on a preset interface data format.

For example, the preset interface data format can be, for example, outputting a corresponding JSON array according to the number and color value of the LED lamp corresponding to each color area. If the LED lamp corresponding lo the color area is the eye lamp LED 1 of the robot, and the corresponding color value is red, the parameter included in the JSON array is [LED 1, COLOR RED].

By transmitting the combined parameter information lo the robot, the robot can control the eye lamp of the robot to emit a corresponding light color after responding to the combined parameter information.

In this embodiment, by loading the simulation image corresponding to the out shape of the eye lamp of the robot onto the display interface of the terminal device of the remote connection, the user only needs to issue the color setting instruction to each color block area in the simulation image, and the display interface of the terminal device can real-time simulate to obtain the eventual light effect of the eye lamp. Since the combined parameter information contain ng each color value is generated and transmitted only when the color confirmation instruction issued by the user is received, it is guaranteed that the robot will respond to an interactive instruction only when the light display effect and the actual demand of the user matches, thus avoiding the situation that the user needs to rewrite the instruction repeatedly, which reduces the probability for the robot to waste system resources, and also improves the control efficiency of the user to the eye lamp of the robot.

Figure 2:
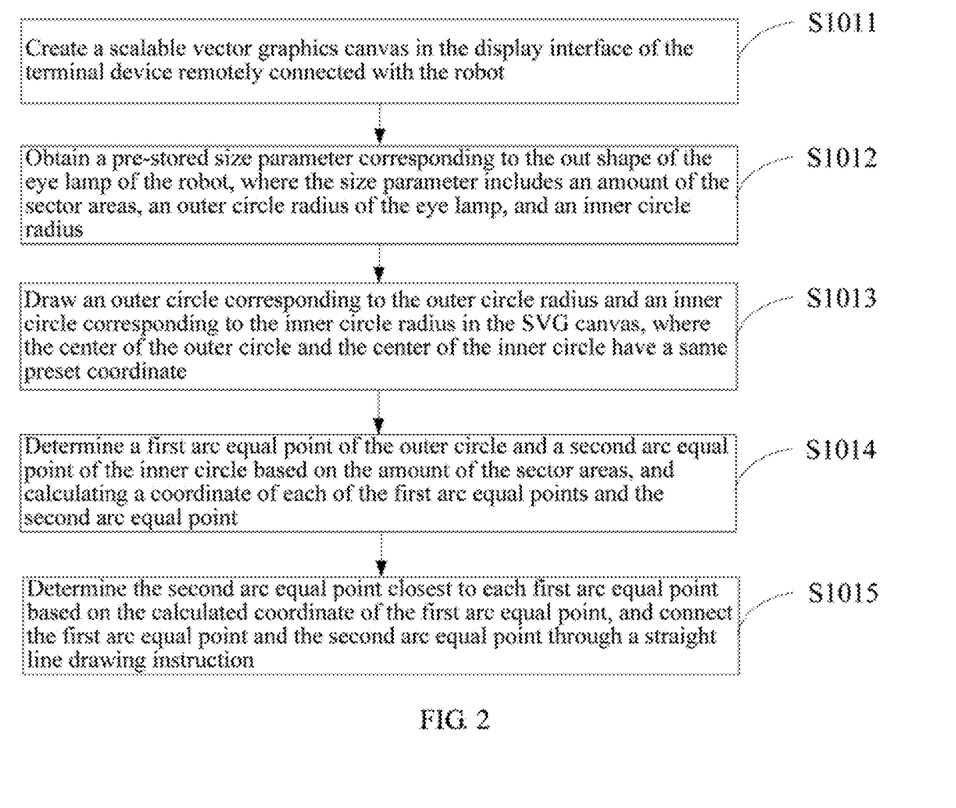
FIG. 2 is a flow chart of an example of step S101 of the robot eye lamp control method of FIG 1.

FIG. 2 is a flow chart of an example of step S101 of the robot eye lamp control method of FIG. 1. As shown in FIG. 2, when the out shape of the eye lamp of the robot includes a plurality of sector areas, step S101 of the robot eye lamp control method can include the following steps.

S1011: creating a scalable vector graphics canvas in the display interface of the terminal device remotely connected with the robot.

The scalable vector graphics (SVG) is a graphical format based on extensible markup language which is for describing two-dimensional vector graphics. In the display interface of the terminal device remotely connected to the robot, if it is detected that the simulation event of the eye lamp of the robot is triggered, the pre-stored SVG canvas drawing code is executed to create an SVG canvas in the display interface of a terminal device.

S1012: obtaining a pre-stored size parameter corresponding to the out shape of the eye lamp of the robot, where the size parameter includes an amount of the sector areas, an outer circle radius of the eye lamp, and an inner circle radius.

In this embodiment, after the terminal device realizes the remote pairing and connection with the robot through the wireless communication module, the size parameter of the out shape of the eye lamp of the robot matching the device model is determined according to the device model uploaded by the robot. The size parameter includes the amount of the sector areas and the outer circle radius and the inner circle radius of the eye lamp.

Figure 3A:
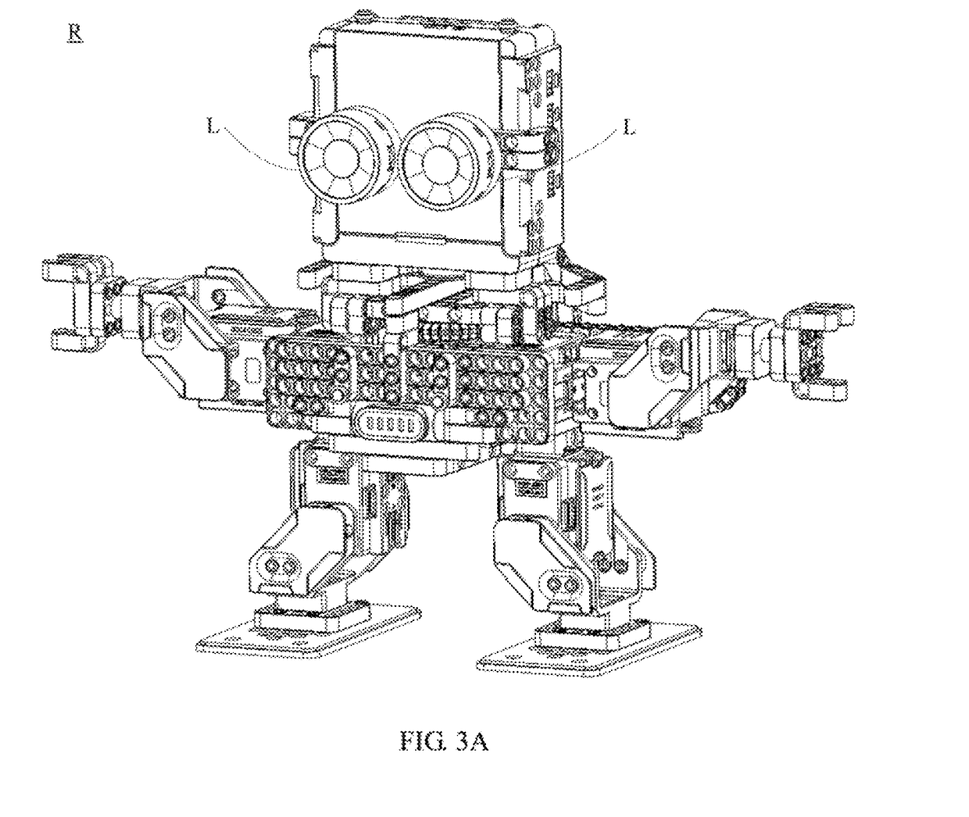
FIG. 3A is a schematic diagram of a robot with eye lamps according to an embodiment of the present disclosure.
Figure 3B:
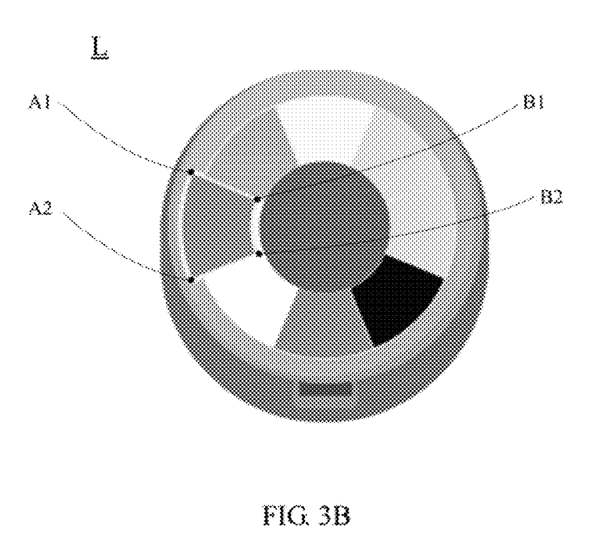
FIG. 3B is a schematic diagram of an out shape of the eye lamp of FIG. 3A.

FIG. 3A is a schematic diagram of a robot with eye lamps according to an embodiment of the present disclosure. As shown in FIG. 3A, a robot R is disposed with two eye lamps L on a head portion of the robot R. FIG. 3B is a schematic diagram of an out shape of the eye lamp of FIG. 3A. As shown in FIG. 3B, the out shape of the eye lamp of the device model is composed of eight sector areas and contains two concentric circles. If the radiuses of the two concentric circles are R and r, respectively, in the size parameter corresponding to the device model that is pre-stored by the terminal device, the amount of the sector areas is 8, and the outer circle radius and the inner circle radius of the eye lamp are respectively R and r.

In this embodiment, the step of obtaining the pre-stored size parameter corresponding to the out shape of the eye lamp of the robot includes:

loading a pre-installed eye lamp simulation plug-in; and receiving the size parameter corresponding to the out shape of the eye lamp of the robot entered by the user in the eye lamp simulation plug-in.

In this embodiment, by triggering the pre-developed eye lamp simulation plug-in, it ensures that the user can input the size parameter of the simulation image to be drawn in real time during the image drawing process, thereby avoiding the drawing error of the image because of the terminal device does not store the size parameter of the eye lump of the robot with the current device model. Therefore, the flexibility of image drawing is improved. By using the above-mentioned input scheme of the size parameter as a common plug-in, the user can reuse the eye lamp simulation plug-in to greatly save the cost of development time and improves development efficiency.

S1013: drawing an outer circle corresponding to the outer circle radius and an inner circle corresponding to the inner circle radius in the SVG canvas, where the center of the outer circle and the center of the inner circle have a same preset coordinate.

In this embodiment, the out shape of the eye lamp of the robot is simulated. Taking an eye lamp of the robot including eight sector areas as an example, a process of drawing a simulation image corresponding to the out shape of the eye lamp is described. It should be noted that, the control method of the eye lamp of the robot provided by this embodiment is also applicable to the eye lamp with other amount of sector areas, which is not limited herein.

Figure 4:
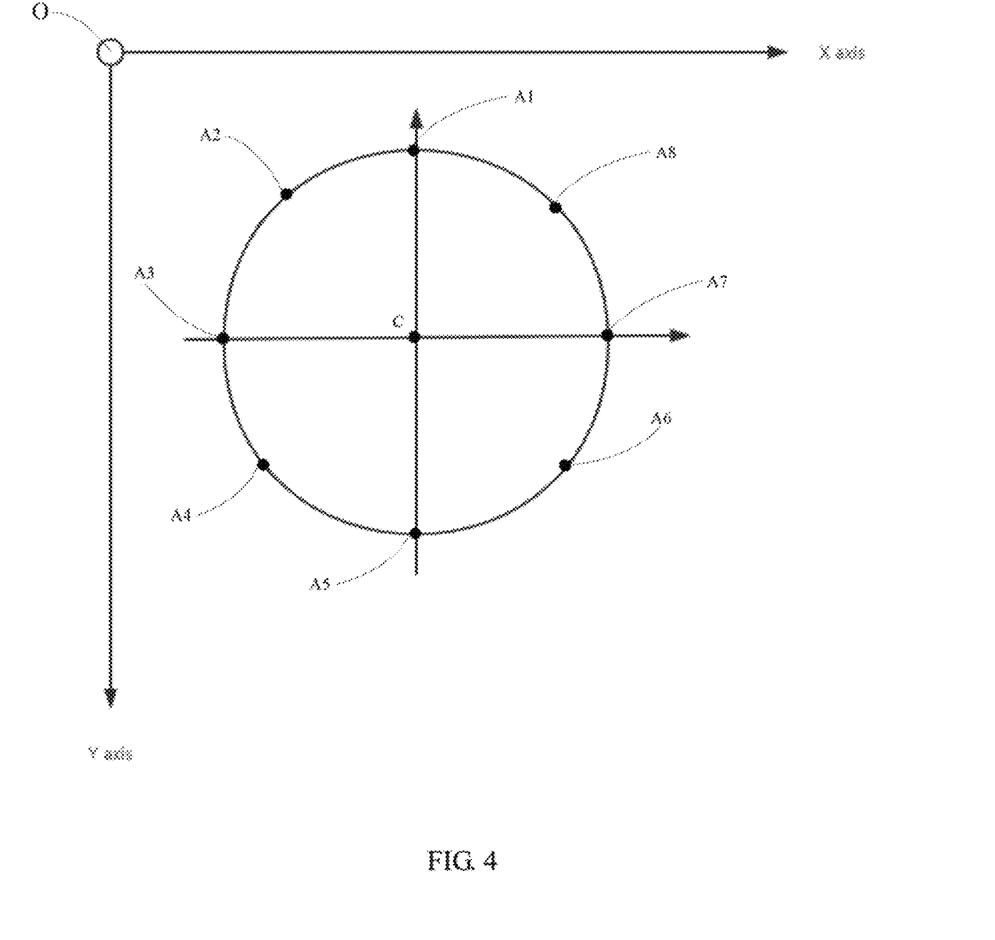
FIG. 4 is a schematic diagram of an SVG canvas according to an embodiment of the present disclosure.

FIG. 4 is a schematic diagram of an SVG canvas according to an embodiment of the present disclosure. As shown in FIG. 4, in the SVG canvas, a Cartesian coordinate system is created with a preset coordinate point as an origin. The coordinate point O corresponding to the coordinate of a pre-stored center is located in the SVG canvas according to the pre-stored coordinate of the center C. Taking the coordinate point obtained by the locating as the origin O, a set of concentric circles including the outer circle and the inner circle (not shown) are drawn according to the read outer circle radius R and inner circle radius r of the above-mentioned eye lamp.

S1014: determining first arc equal point(s) of the outer circle and second arc equal point(s) of the inner circle based on the amount of the sector areas, and calculating a coordinate of each of the first arc equal point(s) and the second arc equal point(s).

In this embodiment, since the amount of the sector areas is 8, the arc of the outer circle is divided into eight equal divisions to determine eight first arc equal points of the outer circle, which are points A1-A8 in FIG 4.

If the coordinate of the preset origin O is (x, y), it can be known from FIG. 4 that, in the outer circle, the coordinate of points A1, A3, A5, and A7 are (x, y−R), (x−R, y), (x, y+R), (x+R, y), respectively. Moreover, according to the Pythagorean theorem, the coordinate of points A2, A4, A6, and A8 can be obtained as (x−R/√2, y−R/√2), (x−R/√2, y+R/√2), (x+R/√2, y−R/√2), (x+R/√2, y+R/√2), respectively.

Similarly, eight equal arc equal points of the inner circle can be determined. If in the SVG canvas, the second arc equal points of the inner circle are points a1-a8, and the coordinate of each arc equal point in the points a1-a8 can be calculated.

S1015: determining the second arc equal point closest to each first arc equal point based on the calculated coordinate of the first arc equal point, and connecting the first arc equal point and the second arc equal point through a straight line drawing instruction.

In this embodiment, for each first arc equal point on the outer circle, the distance between the first arc equal point and each second arc equal point is calculated based on the coordinate of the first arc equal point and the coordinate of each second arc equal point, and the second arc equal point corresponding to the smallest distance is filtered out.

The filtered second circular arc equal point (x2, y2) and the first arc equal point (x1, y1) are connected through the preset straight line drawing instruction of "L x1 y1 x2 y2".

In this embodiment, by creating the SVG canvas in the display interface of the terminal device, the coordinate of each arc equal point in the simulation image corresponding to the out shape of the eye lamp is calculated according to the pre-stored size parameter, and each pair of the arc equal points with the smallest distance are connected based on the straight line drawing instruction, so that the areas between the outer circle and the inner circle can be divided into eight equally divided sector areas, and the simulation of the pattern effect of the out shape of the eye lamp of the robot can be performed in a better manner. In addition, since the SVG image can be searched, indexed, scripted, or compressed, and it can be magnified without distortion when the image quality is not degraded. Therefore, by using the SVG canvas to generate the simulation image, a better interface display effect can be obtained.

Figure 5:
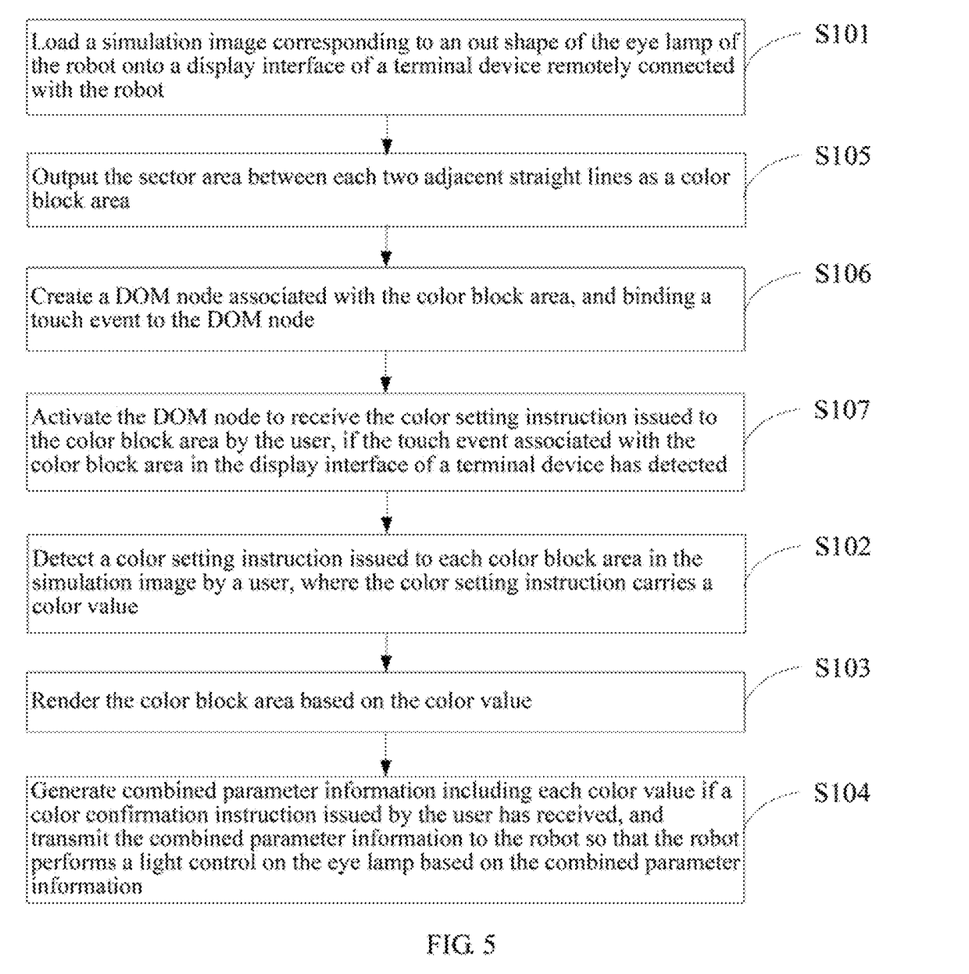
FIG. 5 is a flow chart of another embodiment of a robot eye lamp control method according to the present disclosure.

FIG. 5 is a flow chart of another embodiment of a robot eye lamp control method according to the present disclosure. As shown in FIG. 5, before the above-mentioned step S102, the method may further include the following steps.

S105: outputting the sector area between each two adjacent straight lines as a color block area.

S106: creating a DOM (document object model) node associated with the color block area, and binding a touch event to the DOM node.

S107: activating the DOM node to receive the color setting instruction issued to the color block area by the user, if the touch event associated with the color block area in the display interface of a terminal device has detected.

In this embodiment, after the two arc equal points of the outer circle and the inner circle are connected through the straight line drawing instruction, a plurality of straight lines for dividing the inner area of the circles will be obtained. A closed area composed of two adjacent straight lines and arcs between the two straight lines is output as one color block area. As shown in FIG. 3B, the closed area A1A2B1B2 composed of the straight line A1B1, the straight line A2B2, the circular arc A1A2, and the circular arc B1B2 is one of the color block areas.

In this embodiment, the display interface of the terminal device is rendered in a touch screen of the terminal device. In order to make the JavaScript of the terminal device to respond to the touch operation of the user in each color block area, one corresponding document object model (DOM) node is created for each color block area, and an event processing function is bound to the DOM node. In which, the above-mentioned event processing function is for triggering a pre-installed color wheel component. Therefore, if a touch event for a color block area is detected in the display interface of the terminal device, the pre-installed color wheel component will be triggered, so that the user can click and select the needed color value according to the color value of each graphic control included in the color wheel component, so as to generate the color setting instruction carrying the color value.

In this embodiment, the out shape of the eye lamp of the robot is highly simulated through the simulation image, and the touch event is bound to the DOM node corresponding to each color block area in the simulation image, so that the user can flexibly adjust the color value of the eye lamp of the robot by only performing simple touch operations on the touch screen, thereby enhancing the graphical programming experience of the user; and the interactive operation of the eye lamp of the robot is simplified, thereby also improving the customer stickiness in the robot control process.

Figure 6:
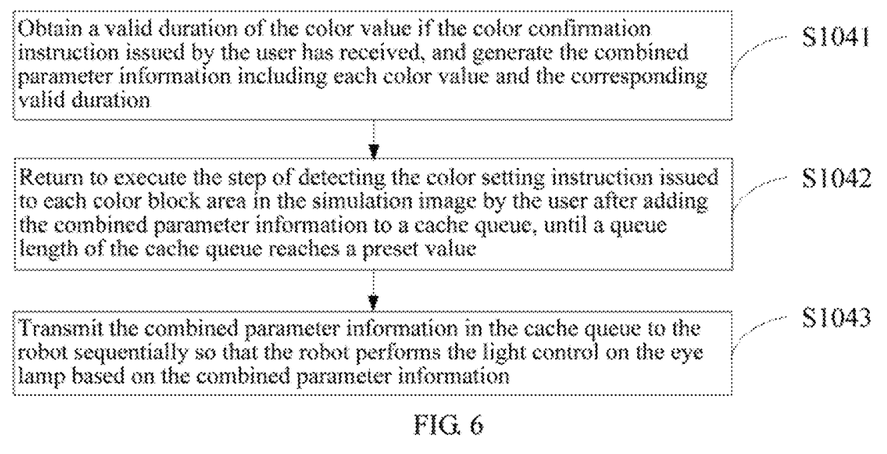
FIG. 6 is a flow chart of an example of step S104 of the robot eye lamp control method of FIG. 1.

FIG. 6 is a flow chart of an example of step S104 of the robot eye lamp control method of FIG. 1. As shown in FIG. 6, in this embodiment, the above-mentioned step S104 of the robot eye lamp control method may include the following steps.

S1041: obtaining a valid duration of the color value if the color confirmation instruction issued by the user has received, and generating the combined parameter information including each color value and the corresponding valid duration.

In this embodiment, when receiving the color confirmation instruction issued by the user, a prompt dialog box is shown to prompt the user to input an effective duration of the color value for each color block area in the SVG canvas. The effective duration indicates the duration that the LED eye lamp of the robot needs to flash with this color value.

In this embodiment, the combined parameter information including the color value corresponding to each color block area and the effective duration is generated. Therefore, if the simulation image contains N (N is an integer greater than zero) color block areas, the generated combined parameter information will contain N arrays, and each array contains three element values. The above-mentioned three element values are respectively for representing the number of the LED eye lamp of the robot, the color value, and the effective duration corresponding to the array.

S1042: returning to execute the step of detecting the color setting instruction issued to each color block area in the simulation image by the user after adding the combined parameter information to a cache queue, until a queue length of the cache queue reaches a preset value.

S1043: transmitting the combined parameter information in the cache queue to the robot sequentially so that the robot performs the light control on the eye lamp based on the combined parameter information.

The combination parameter information generated at tire current time is added to the cache queue, and whether the length of the cache queue reaches the preset value is determined. If no, it returns to step S102 to continue to determine the color value that the user needs to adjust for the eye lamp of the robot.

Otherwise, if yes, it indicates that the current cache space is insufficient. Therefore, each cached combined parameter information needs to be sequentially transmitted to the remotely connected robot, so that the robot performs lighting control on the LED eye lamp in sequence according to the combined parameter information received by the robot.

In this embodiment, when the color confirmation instruction issued by the user is received, the effective duration of the color value is obtained, and the combined parameter information including each color value and the corresponding effective duration is generated, so that the robot can control the color of the LED eye lamp and the duration of the flashing accurately, which avoids the necessary for the user to continuously issue interactive instructions, thereby improving the control efficiency of the eye lamp of the robot.

In an application scenario, if the light flashing manner corresponding to an emergency call signal is "red-yellow-red-yellow", and the combined parameter information including the "red" color value is directly transmitted to the robot after generated. In the case that the user operates slow and a delay is caused in transmitting the combined parameter information containing the "yellow" color value, the eye lamp of the robot will not welly simulate the light animation effect of alternative red and yellow. Therefore, in this embodiment, by adding the combined parameter information to the cache queue and transmitting all the combined parameter information to the robot s sequentially only when the length of the cache queue reaches the preset value, thereby achieving a better animative control effect of the light.

FIG. 7 is a schematic block diagram of an embodiment of a robot eye lamp control apparatus according to the present disclosure. A robot eye lamp control apparatus is provided, which corresponds to the above-mentioned robot eye lamp control method. For the convenience of explanation, only the parts related to this embodiment are shown. As shown in FIG. 7, the apparatus includes:

a first loading unit 71 configured to load a simulation image corresponding to an out shape of the eye lamp of the robot onto a display interface of a terminal device remotely connected with the robot;

a detection unit 72 configured to detect a color setting instruction issued to each color block area in the simulation image by a user, where the color setting instruction carries a color value;

a rendering unit 73 configured to render the color block area based on the color value; and a transmission unit 74 configured to generate combined parameter information including each color value if a color confirmation instruction issued by the user has received, and transmitting the combined parameter information to the robot so that the robot performs a light control on the eye lamp based on the combined parameter information.

In one embodiment, the out shape of the eye lamp of the robot includes a plurality of sector areas, and correspondingly the first loading unit 71 includes:

a creation subunit configured to create a scalable vector graphics canvas in the display interface of the terminal device remotely connected with the robot;

an obtaining subunit configured to obtain a pre-stored size parameter corresponding to the out shape of the eye lamp of the robot, where the size parameter includes an amount of the sector areas, an outer circle radius of the eye lamp, and an inner circle radius;

a drawing subunit configured to draw an outer circle corresponding to the outer circle radius and an inner circle corresponding to the inner circle radius in the SVG canvas, where the center of the outer circle and the center of the inner circle have a same preset coordinate;

a determining subunit configured to determine first are equal point(s) of the outer circle and second arc equal point(s) of the inner circle based on the amount of the sector areas, and calculating a coordinate of each of the first arc equal point(s) and the second arc equal point(s); and a connection subunit configured to determine the second are equal point closest to each first arc equal point based on the calculated coordinate of the first arc equal point, and connecting the first arc equal point and the second arc equal point through a straight line drawing instruction.

In one embodiment, the robot eye lamp control apparatus further includes:

an output unit configured to output the sector area between each two adjacent straight lines as a color block area;

a binding unit configured to create a document object model DOM node associated with the color block area, and binding a touch event to the DOM node; and an activation unit configured to activate the DOM node to receive the color setting instruction issued to the color block area by the user, if the touch event associated with the color block area in the display interface of a terminal device has detected.

In one embodiment, the robot eye lamp control apparatus further includes:

a second loading unit configured to load a pre-installed eye lamp simulation plug-in; and a reception unit configured to receive the size parameter corresponding to the out shape of the eye lamp of the robot entered by the user in the eye lamp simulation plug-in.

In this embodiment, each of the above-mentioned units/subunits is implemented in the form of software, which can be computer program(s) stored in a memory of the robot eye lamp control apparatus and executable on a processor of the robot eye lamp control apparatus. In other embodiments, each of the above-mentioned units/subunits may be implemented in the form of hardware (e.g., a circuit of the robot eye lamp control apparatus which is coupled to the processor of the robot eye lamp control apparatus) or a combination of hardware and software (e.g., a circuit with a single chip microcomputer).

In this embodiment, by loading the simulation image corresponding to the out shape of the eye lamp of the robot onto the display interface of the terminal device of the remote connection, the user only needs to issue the color setting instruction to each color block area in the simulation image, and the display interface of the terminal device can real-time simulate to obtain the eventual light effect of the eye lamp. Since the combined parameter information contain ng each color value is generated and transmitted only when the color confirmation instruction issued by the user is received, it is guaranteed that the robot will respond to an interactive instruction only when the light display effect and the actual demand of the user matches, thus avoiding the situation that the user needs to rewrite the instruction repeatedly, which reduces the probability for the robot to waste system resources, and also improves the control efficiency of the user to the eye lamp of the robot.

FIG. 8 is a schematic block diagram of an embodiment of a terminal device according to the present disclosure. As shown in FIG. 8, in this embodiment, the terminal device 8 is a mobile terminal device such as a mobile phone, a tablet, and a laptop computer, which includes a processor 80, a storage 81, and a computer program 82 stored in the storage 81 and executable on the processor 80, for example, a robot eye lamp control program. When executing (instructions in) the computer program 82, the processor 80 implements the steps in the above-mentioned embodiments of the robot eye lamp control method, for example, steps S101-S104 shown in FIG. 1. Alternatively, when the processor 80 executes the (instructions in) computer program 82, the functions of each module/unit in the above-mentioned device embodiments, for example, the functions of the units 71-74 shown in FIG. 7 are implemented.

Exemplarily, the computer program 82 may be divided into one or more modules/units, and the one or more modules/units are stored in the storage 81 and executed by the processor 80 to realize the present disclosure. The one or more modules/units may be a series of computer program instruction sections capable of performing a specific function, and the instruction sections are for describing the execution process of the computer program 82 in the terminal device 8.

The terminal device 8 may be a computing device such as a desktop computer, a notebook computer, a tablet computer, and a cloud server. The terminal device 8 may include, but is not limited to, the processor 80 and the storage 81. It can be understood by those skilled in the art that FIG. 8 is merely an example of the terminal device 8 and does not constitute a limitation on the terminal device 8, and may include more or fewer components than those shown in the figure, or a combination of some components or different components. For example, the terminal device 8 may further include an input/output device, a network access device, a bus, and the like.

The processor 80 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 81 may be an internal storage unit of the terminal device 8, for example, a hard disk or a memory of the terminal device 8. The storage 81 may also be an external storage device of the terminal device 8, for example, a plug-in hard disk, a smart media card (SMC), a secure digital (SD) card, flash card, and the like, which is equipped on the terminal device 8. Furthermore, the storage 81 may further include both an internal storage unit and an external storage device, of the terminal device 8. The storage 81 is configured to store the computer program 82 and other programs and data required by the terminal device 8. The storage 81 may also be used to temporarily store data that has been or will be output.

In addition, each of the functional units in each of the embodiments of the present disclosure can be integrated in one processing unit. Each unit can be physically exists alone, or two or more units can be integrated in one unit. The above-mentioned integrated unit can be implemented either in the form of hardware, or in the form of software functional units.

The integrated unit can be stored in a computer-readable storage medium if it is implemented in the form of a software functional unit and sold or utilized as a separate product. Based on this understanding, the technical solution of the present disclosure, either essentially or in part, contributes to the prior art, or all or a part of the technical solution can be embodied in the form of a software product. The software product is stored in a storage medium, which includes a number of instructions for enabling a computer device (which can be a personal computer, a server, a network device, etc.) or a processor to execute all or a pan of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

As mentioned above, the forgoing embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented control method for an eye lamp of a robot, comprising executing on a processor steps of:
   loading a simulation image corresponding to an out shape of the eye lamp of the robot onto a display interface of a terminal device remotely connected with the robot;
   detecting a color setting instruction issued to each color block area in the simulation image by a user, wherein the color setting instruction carries a color value;
   rendering the color block area based on the color value; and
   generating combined parameter information comprising each color value in response to having received a color confirmation instruction issued by the user, and transmitting the combined parameter information to the robot so that the robot performs a light control on the eye lamp based on the combined parameter information;
   wherein the out shape of the eye lamp of the robot comprises a plurality of sector areas, and the step of loading the simulation image corresponding to the out shape of the eye lamp of the robot onto the display interface of the terminal device remotely connected with the robot comprises:
   creating a scalable vector graphics (SVG) canvas in the display interface of the terminal device remotely connected with the robot;
   obtaining a pre-stored size parameter corresponding to the out shape of the eye lamp of the robot, wherein the size parameter comprises an amount of the sector areas, an outer circle radius of the eye lamp, and an inner circle radius;
   drawing an outer circle corresponding to the outer circle radius and an inner circle corresponding to the inner circle radius in the SVG canvas, wherein the center of the outer circle and the center of the inner circle have a same preset coordinate;
   determining one or more first arc equal points of the outer circle and one or more second arc equal points of the inner circle based on the amount of the sector areas, and calculating a coordinate of each of the one or more first arc equal points and the one or more second arc equal points; and
   determining the second arc equal points closest to each first arc equal point based on the calculated coordinate of the first arc equal point, and connecting the first arc equal point and the second arc equal point through a straight line drawing instruction.

2. The method of claim 1, wherein the step of detecting the color setting instruction issued to each color block area in the simulation image by the user comprises:
   outputting the sector area between each two adjacent straight lines as a color block area;
   creating a document object model node associated with the color block area, and binding a touch event to the document object model node;
   activating the document object model node to receive the color setting instruction issued to the color block area by the user, in response to having detected the touch event associated with the color block area in the display interface of the terminal device remotely connected with the robot.

3. The method of claim 1, wherein before the step of creating the SVG canvas in the display interface of the terminal device remotely connected with the robot further comprises:
   loading a pre-installed eye lamp simulation plug-in; and
   receiving the size parameter corresponding to the out shape of the eye lamp of the robot entered by the user in the eye lamp simulation plug-in.

4. The method of claim 1, wherein the step of generating the combined parameter information comprising each color value in response to having received the color confirmation instruction issued by the user, and transmitting the combined parameter information to the robot so that the robot performs the light control on the eye lamp based on the combined parameter information comprises:
   obtaining a valid duration of the color value in response to having received the color confirmation instruction issued by the user, and generating the combined parameter information comprising each color value and the corresponding valid duration;
   returning to execute the step of detecting the color setting instruction issued to each color block area in the simulation image by the user after adding the combined parameter information to a cache queue, until a queue length of the cache queue reaches a preset value; and
   transmitting the combined parameter information in the cache queue to the robot sequentially so that the robot performs the light control on the eye lamp based on the combined parameter information.

5. The method of claim 1, wherein each color block area in the simulation image is an operable object in the display interface of the terminal device remotely connected with the robot, and an operation object of the color setting instruction is one color block area selected by the user.

6. The method of claim 5, wherein when the user is to select a color for any of the color block areas, a pre-installed color wheel component is executed, the pie-installed color wheel component is for displaying graphic controls corresponding to various color values, and the color setting instruction carrying the color value is generated based on a color value of a selected graph is control.

7. The method of claim 1, wherein the step of rendering the color block area based on the color value comprises:
   parsing the color setting instruction to extract the color value carried by the color setting instruction;
   reading a style parameter associated with the color block area; and
   rendering the color block area based on the color value, by updating a color attribute in the style parameter as the color value carried by the color setting instruction.

8. The method of claim 1, wherein the combined parameter information is generated based on a preset interface data format, and the preset interface data format is outputting a corresponding JavaScript object notation array according to a number and a color value of an eye lamp corresponding to each color block area.

9. A non-transitory computer readable medium, containing instructions, that when executed by a processor perform the steps of:
   loading a simulation image corresponding to an out shape of the eye lamp of the robot onto a display interface of a terminal device remotely connected with the robot;
   detecting a color setting instruction issued to each color block area in the simulation image by a user, wherein the color setting instruction carries a color value;
   rendering the color block area based on the color value; and
   generating combined parameter information comprising each color value in response to having received a color confirmation instruction issued by the user, and transmitting the combined parameter information to the robot so that the robot performs a light control on the eye lamp based on the combined parameter information;

wherein the step of generating the combined parameter information comprising each color value in response to having received the color confirmation instruction issued by the user, and transmitting the combined parameter information to the robot so that the robot performs the light control on the eye lamp based on the combined parameter information comprises:

obtaining a valid duration of the color value in response to having received the color confirmation instruction issued by the user, and generating the combined parameter information comprising each color value and the corresponding valid duration;

returning to execute the step of detecting the color setting instruction issued to each color block area in the simulation image by the user after adding the combined parameter information to a cache queue, until a queue length of the cache queue reaches a preset value; and transmitting the combined parameter information in the cache queue to the robot sequentially so that the robot performs the light control on the eye lamp based on the combined parameter information.

10. The non-transitory computer readable medium of claim 9, wherein the out shape of the eye lamp of the robot comprises a plurality of sector areas, and the step of loading the simulation image corresponding to the out shape of the eye lamp of the robot onto the display interface of the terminal device remotely connected with the robot comprises:

creating a scalable vector graphics (SVG) canvas in the display interface of the terminal device remotely connected with the robot;

obtaining a pre-stored size parameter corresponding to the out shape of the eye lamp of the robot, wherein the size parameter comprises an amount of the sector areas, an outer circle radius of the eye lamp, and an inner circle radius:

drawing an outer circle corresponding to the outer circle radius and an inner circle corresponding to the inner circle radius in the SVG canvas, wherein the center of the outer circle and the center of the inner circle have a same preset coordinate;

determining one or more first arc equal points of the outer circle and a one or more second arc equal points of the inner circle based on the amount of the sector areas, and calculating a coordinate of each of the one or more first arc equal points and the one or more second arc equal points; and determining the second arc equal points closest to each first arc equal point based on the calculated coordinate of the first arc equal point, and connecting the first arc equal point and the second arc equal point through a straight line drawing instruction.

11. The non-transitory computer readable medium of claim 10, the steps further comprising:

outputting the sector area between each two adjacent straight lines as a color block area;

creating a document object model node associated with the color block area, and binding a touch event to the document object model node;

activating the document object model node to receive the color setting instruction issued to the color block area by the user, in response to having detected the touch event associated with the color block area in the display interface of the terminal device remotely connected with the robot.

12. The non-transitory computer readable medium of claim 10, wherein before the step of creating the SVG canvas in the display interface of the terminal device remotely connected with the robot further comprises:

loading a pre-installed eye lamp simulation plug-in; and receiving the size parameter corresponding to the out shape of the eye lamp of the robot entered by the user in the eye lamp simulation plug-in.

13. The non-transitory computer readable medium of claim 9, wherein each color block area in the simulation image is an operable object in the display interface of the terminal device remotely connected with the robot, and an operation object of the color setting instruction is one color block area selected by the user.

14. The non-transitory computer readable medium of claim 13, wherein when the user is to select a color for any of the color block areas, a pre-installed color wheel component is executed, the pre-installed color wheel component is for displaying graphic controls corresponding to various color values, and the color setting instruction carrying the color value is generated based on a color value of a selected graphic control.

15. A terminal device, comprising:

a memory;

a processor; and one or more computer programs stored in the memory and executable on the processor, wherein the one or more computer programs comprise:

instructions for loading a simulation image corresponding to an out shape of the eye lamp of the robot onto a display interface of a device remotely connected with the robot;

instructions for detecting a color setting instruction issued to each color block area in the simulation image by a user, wherein the color setting instruction carries a color value;

instructions for rendering the color block area based on the color value; and instructions for generating combined parameter information comprising each color value in response to having received a color confirmation instruction issued by the user, and transmitting the combined parameter information to the robot so that the robot performs a light control on the eye lamp based on the combined parameter information:

wherein the instructions for generating the combined parameter information comprising each color value in response to having received the color confirmation instruction issued by the user, and transmitting the combined parameter information to the robot so that the robot performs the light control on the eye lamp based on the combined parameter information comprise:

instructions for obtaining a valid duration of the color value in response to having received the color confirmation instruction issued by the user, and generating the combined parameter information comprising each color value and the corresponding valid duration:

instructions for returning to execute the instructions for detecting the color setting instruction issued to each color block area in the simulation image by the user after adding the combined parameter information to a cache queue, until a queue length of the cache queue reaches a preset value; and instructions for transmitting the combined parameter information in the cache queue to the robot sequentially so that the robot performs the light control on the eye lamp based on the combined parameter information.

16. The terminal device of claim 15, wherein the out shape of the eye lamp of the robot comprises a plurality of sector areas, and the instructions for loading the simulation image corresponding to the out shape of the eye lamp of the robot onto the display interface of the device remotely connected with the robot comprise:
  instructions for creating a scalable vector graphics (SVG) canvas in the display interface of the device remotely connected with the robot;
  instructions for obtaining a pre-stored size parameter corresponding to the out shape of the eye lamp of the robot, wherein the size parameter comprises an amount of the sector areas, an outer circle radius of the eye lamp, and an inner circle radius;
  instructions for drawing an outer circle corresponding to the outer circle radius and an inner circle corresponding to the inner circle radius in the SVG canvas, wherein the center of the outer circle and the center of the inner circle have a same preset coordinate;
  instructions for determining one or more first arc equal points of the outer circle and one or more second arc equal points of the inner circle based on the amount of the sector areas, and calculating a coordinate of each of the one or more first arc equal points and the one or more second arc equal points; and
  instructions for determining the second arc equal points closest to each first arc equal point based on the calculated coordinate of the first arc equal point, and connecting the first arc equal point and the second arc equal point through a straight line drawing instruction.

17. The terminal device of claim 16, wherein the instructions for detecting the color setting instruction issued to each color block area in the simulation image by the user comprise:
  instructions for outputting the sector area between each two adjacent straight lines as a color block area;
  instructions for creating a document object model node associated with the color block area, and binding a touch event to the document object model node;
  instructions for activating the document object model node to receive the color setting instruction issued to the color block area by the user, in response to having detected the touch event associated with the color block area in the display interface of the device remotely connected with the robot.

18. The terminal device of claim 16, wherein the one or more computer programs further comprise:
  instructions for loading a pre-installed eye lamp simulation plug-in; and
  instructions for receiving the size parameter corresponding to the out shape of the eye lamp of the robot entered by the user in the eye lamp simulation plug-in.

19. The terminal device of claim 15, wherein each color block area in the simulation image is an operable object in the display interface of the terminal device remotely connected with the robot, and an operation object of the color setting instruction is one color block area selected by the user.

20. The terminal device of claim 19, wherein when the user is to select a color for any color block area, a pre-installed color wheel component is executed, the pre-installed color wheel component is for displaying graphic controls corresponding to various color values, and the color setting instruction carrying the color value is generated based on a color value of a selected graphic control.

* * * * *